United States Patent [19]
Uchiyama

[11] Patent Number: 5,233,483
[45] Date of Patent: Aug. 3, 1993

[54] MAGNETIC WRITE/READ DEVICE

[75] Inventor: Sadao Uchiyama, Higashihiroshima, Japan

[73] Assignee: Sharp Kabushiki Kaisha, Osaka, Japan

[21] Appl. No.: 785,054

[22] Filed: Oct. 30, 1991

[30] Foreign Application Priority Data

Oct. 31, 1990 [JP] Japan .................. 2-296264

[51] Int. Cl.⁵ .......................................... G11B 15/14
[52] U.S. Cl. .................................. 360/64; 360/31; 360/107
[58] Field of Search ........................ 360/31, 64, 107

[56] References Cited

U.S. PATENT DOCUMENTS

| 5,012,355 | 4/1991 | Taga et al. ............... 360/31 |
| 5,018,036 | 5/1991 | Yamashita ............... 360/107 |
| 5,023,731 | 6/1991 | Morisaki ............... 360/31 |
| 5,099,375 | 3/1992 | Ishii et al. ............... 360/107 |
| 5,155,641 | 10/1992 | Kubo et al. ............... 360/107 |

FOREIGN PATENT DOCUMENTS 61-51661 3/1986 Japan .
63-288492 11/1988 Japan .
2-68708 5/1990 Japan .
2-203416 8/1990 Japan .

*Primary Examiner*—Edward P. Westin
*Assistant Examiner*—Andrew Sanders
*Attorney, Agent, or Firm*—Nixon & Vanderhye

[57] ABSTRACT

A magnetic write/read device with use of a rotating drum system in which first and second writing heads are arranged around a rotating drum and the first and second writing heads overwrite first and second tracks on a magnetic tape so that one frame is formed by a pair of the adjacent first and second tracks, the magnetic write/read device comprises first and second reading heads arranged in the rotating drum and corresponding to the first and second writing heads, respectively and the controlling means for controlling each head in sequence so that the first track of the present frame is recorded by the first writing head and then the first and second tracks of the penultimate frame are reproduced by the first and second reading heads, and in turn the second track of the present frame is recorded by the second writing head.

3 Claims, 10 Drawing Sheets

FIG. 5(a) CONVENTIONAL EXAMPLE

FIG. 5(b) EMBODIMENT 1

FIG. 5(c) EMBODIMENT 2

MAGNETIC WRITE/READ DEVICE

FIELD OF THE INVENTION

The present invention relates to a magnetic write-/read device and, more particularly, to a magnetic write/read device with use of a rotating drum system.

BRIEF DESCRIPTION OF THE DRAWINGS

FIGS. 6 to 15 relate to a conventional example, in which:

DESCRIPTION OF THE RELATED ART

Figure 6:
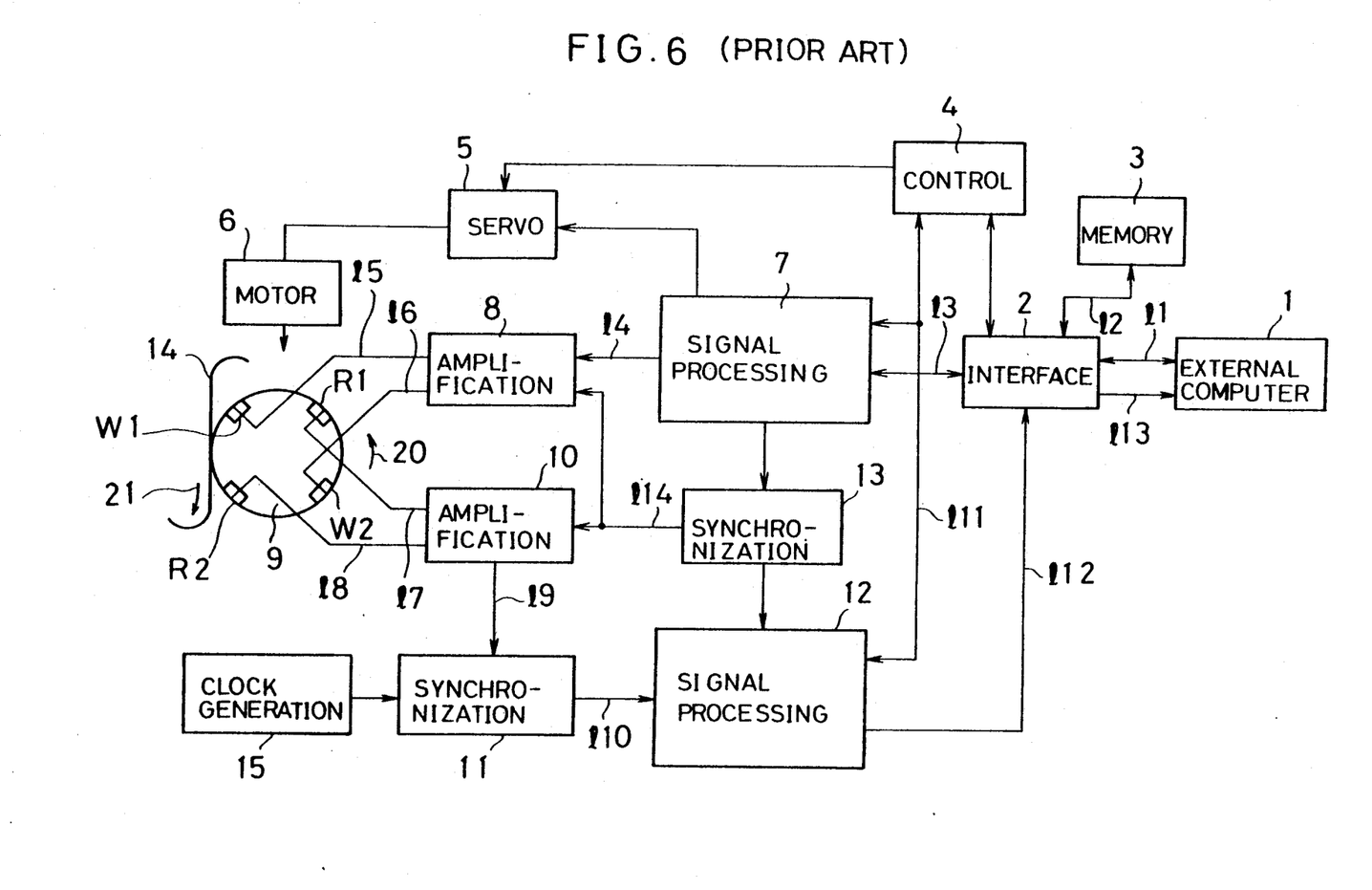
FIG. 6 is a block diagram showing an example of a structure of a magnetic write/read device.

FIG. 6 is a block diagram showing an example of a structure of a conventional magnetic write/read device. According to this magnetic write/read device, a digital audio tape recorder of a rotating drum system (referred to as R-DAT hereinafter) is used as an auxiliary storage of an external computer 1. Referring to FIG. 6, when data from the external computer 1 is written on a magnetic tape 14, the data from the external computer 1 is applied to an interface 2 through a line 11. The data on the line 11 includes image information, aural information, operation processing information or the like and transmission takes place for the data covering two tracks of the magnetic tape to be described later as one transmission unit (referred to as a frame hereinafter). One frame comprises, for example 5120-byte data which is divided into each frame and is output from the external computer 1.

Figure 7:
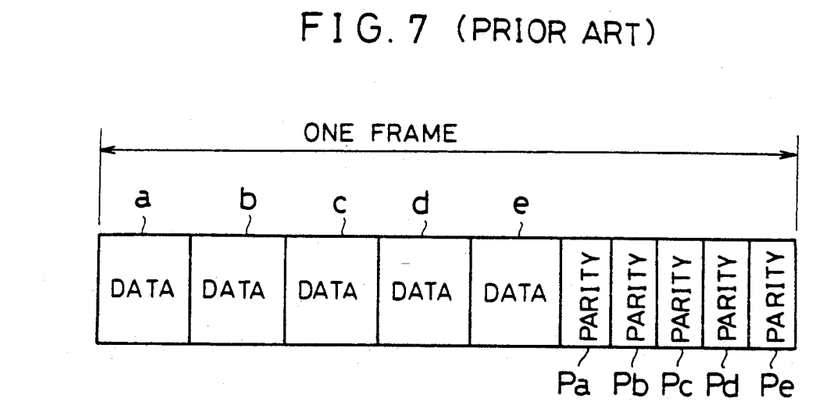
FIG. 7 is a schematic view showing a structure of one frame data used in a R-DAT.

According to the conventional device shown in FIG. 6, one frame is divided into a plurality of regions as shown in FIG. 7. More specifically, one frame comprises five data regions a to e and parity regions Pa to Pe which individually corresponds to the data regions a to e, respectively. The above described 5120-byte data is divided into data regions a to e each having a data amount of 1024 byte and stored. The parity regions Pa to Pe each have, for example 128-byte data and correspond to data regions a to e, respectively. The data of the parity regions Pa to Pe is added in the interface 2 and used as an error correcting sign. In addition, the parity is also added in a signal processing circuit 7 in the R-DAT as will be described later. Thus, further higher reliability as the auxiliary storage can be obtained by the structure of one frame shown in FIG. 7.

Such data is output from the interface 2 to a memory such as a random access memory through the line 12 and also output to the signal processing circuit 7 through a line 13. A memory 3 is divided into eight storage regions M0 to M7 and each of the storage regions M0 to M7 stores data for one frame.

Figure 8A:
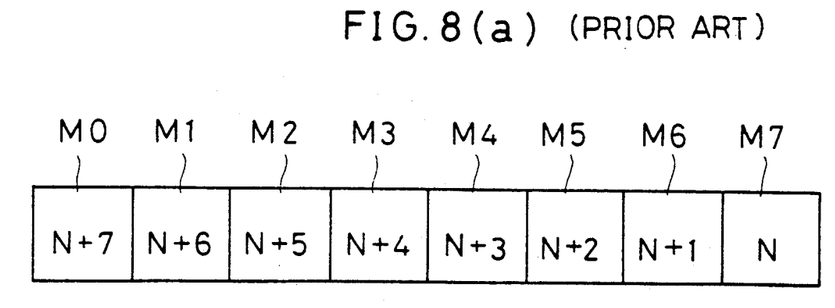
FIGS. 8(a) to (c) are expedient views each showing a storage region of a memory shown in FIG. 6.
Figure 8B:
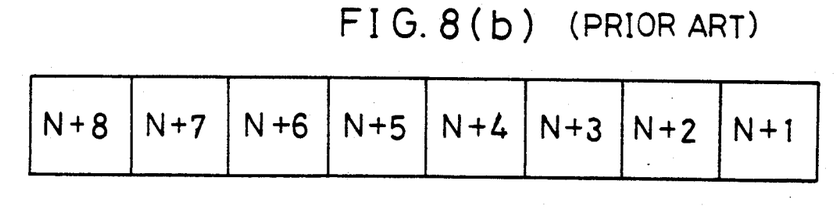
Figure 8C:
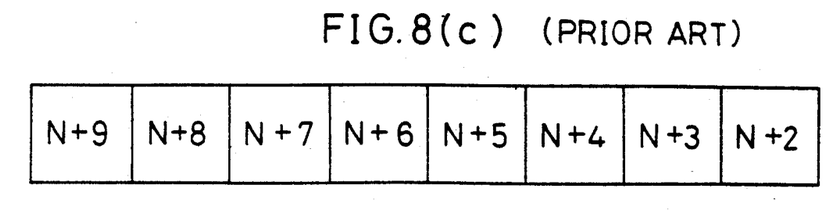

In the memory 3, data for one frame from the interface 2 is first stored in the storage region M0. In response to entry into MC, data in the storage regions M0 to M6 of the memory 3 is sequentially transmitted rightward or to the storage regions M1 to M7. The data in the storage region M7 is normally erased. For example, as shown in FIG. 8(a), if data of a frame number N+7 to N to be described later is stored in the storage regions M0 to M7, while data of the frame number N+8 and N+9 is sequentially input, the memory 3 changes from a state shown in FIG. 8(b) to a state shown in FIG. 8(c). Input/output operation or the like in the interface 2 is performed in accordance with control signals from the control circuit 4 comprising a microcomputer.

The parity in the normal R-DAT is added to data input from the interface 2 into the signal processing circuit 7 through the line 13. The data with the parity added is output to an amplifier 8 through a line 14. The data signal amplified by the amplifier 8 is applied to the writing head W1 through the line 15 and to the writing head W2 through the line 16 in a switching manner and then written on the magnetic tape 14. The switching operation by the amplifier 8 is controlled by a signal synchronized with the rotation of the rotating drum 9 from the synchronous circuit 13.

The above writing heads W1 and W2 and reading heads R1 and R2 to be described later are fixed to a cylindrical rotating drum 9.

Figure 9:
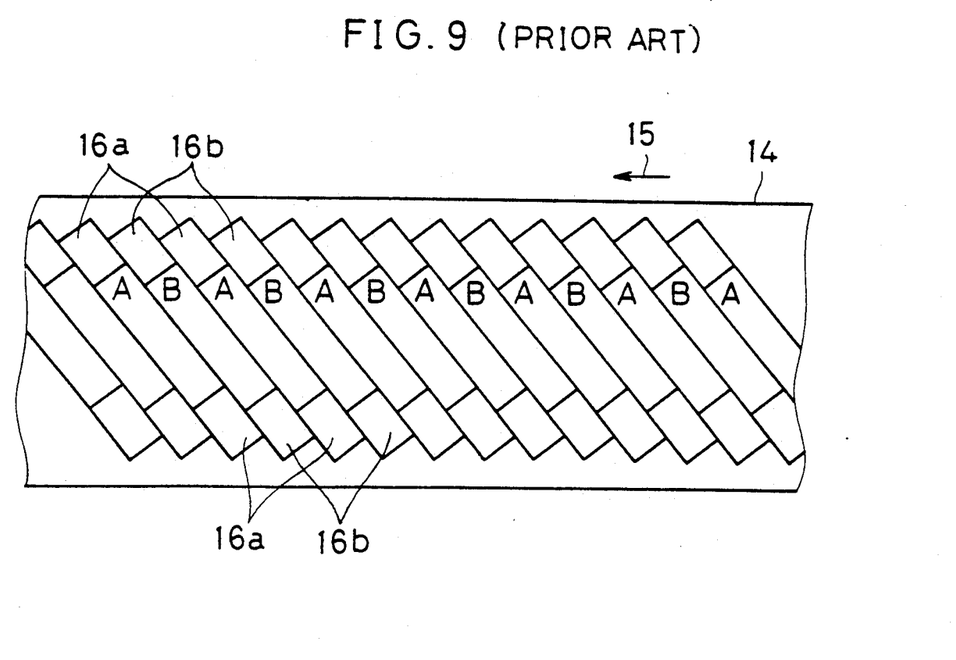
FIG. 9 is a schematic view showing a scanning direction by the magnetic head.

In addition, the writing heads W1 and W2 scan the magnetic tape 14 in a diagonally direction or in the azimuth style as shown in FIG. 9 to form tracks A and B. The above described frame number is recorded at a part of the subcode regions 16a and 16b. The data written on the magnetic tape 14 is read by the reading heads R1 and R2 corresponding to the writing heads W1 and W2, respectively. The signals from the reading heads R1 and R2 are applied to an amplifier 10 through the line 17 and line 18, respectively. At this time, the reading heads R1 and R2 read data on the tracks A and B formed by the writing heads W1 and W2, respectively.

The data signal amplified by the amplifier 10 is output to a synchronous circuit 11 through a line 19 and synchronized with clock signals from a clock generation circuit 15 in the synchronous circuit 11. In addition, the amplifier 10 switches the output from the reading heads R1 and R2 in accordance with the synchronous signal from the synchronous circuit 13 and then output them to the line 19. The output from the synchronous circuit 11 is output to the signal processing circuit 12 through a line 110 and error of the data is corrected in the signal processing circuit 12. This error correction is performed on the basis of the parity added in the signal processing circuit 7. The signal processing such as error correction is performed by the synchronous circuit 13 in synchronization with the signal processing such as parity addition in the signal processing circuit 7.

The data output from the signal processing circuit 12 is applied to the above-described interface 2 through a line 112. Usually, the data is stored in the memory 3 through the line 12 and then read from the memory 3 and output to the external computer 1 by the interface 2.

Figure 10:
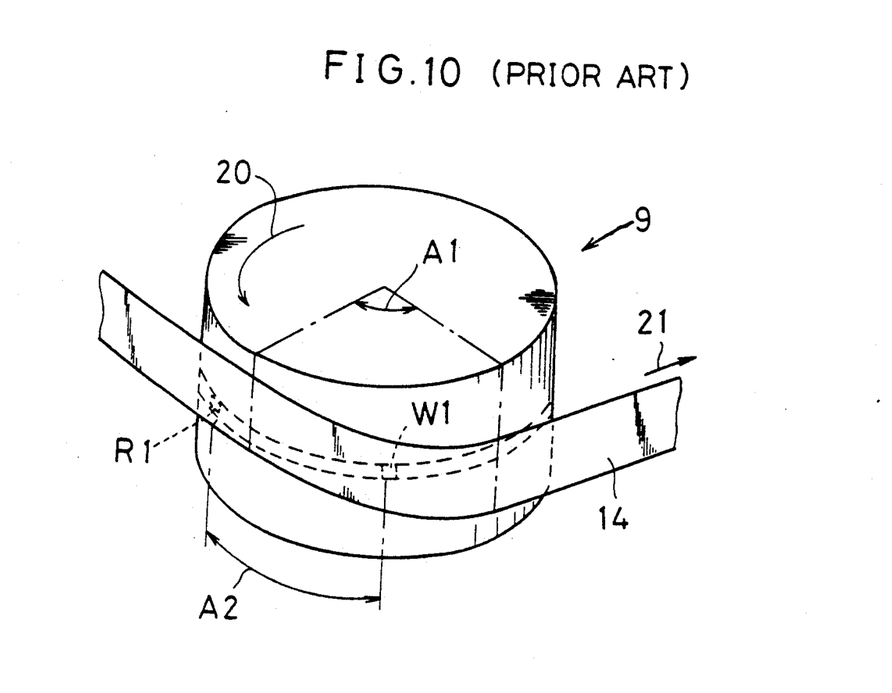
FIG. 10 is a perspective view showing a structure a rotating drum used in a conventional R-DAT and its vicinity.

FIG. 10 is a perspective view showing a structure of the rotating drum 9 and its vicinity. The rotating drum 9 is moved round an axis by a motor 6 in a direction shown by an arrow 20. At this time, a servo circuit 5 controls a rotating speed of the motor 6. In addition, the magnetic tape 14 is driven by a capstan motor (not shown) or the like in a direction shown by an arrow 21. The magnetic tape 14 is in contact with a side face of the rotating drum 9 for a length defined by an angle of $\theta 1$.

The writing heads W1 and W2 are positioned on two ends of one diameter on the side face of the rotating drum 9. Similarly, the reading heads R1 and R2 are positioned on two ends of another diameter on the side face of the rotating drum 9. The writing head W2 and the reading head R1 are positioned circumferentially on the rotating drum side face with a subtending angle of $\theta 2$ and slightly shifted axially. And the same is true of the relation between W1 and R2.

Figure 11:
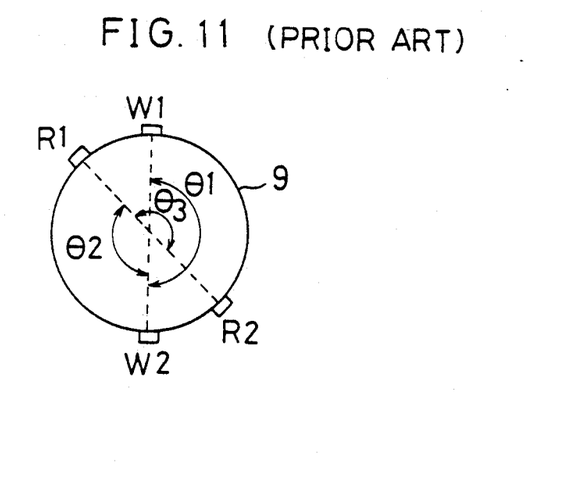
FIG. 11 is a schematic view showing an arrangement of magnetic heads in the rotating drum in the conventional R-DAT.

FIG. 11 is a view showing an arrangement of writing heads and reading heads around the rotating drum in a conventional R-DAT.

Figure 12:
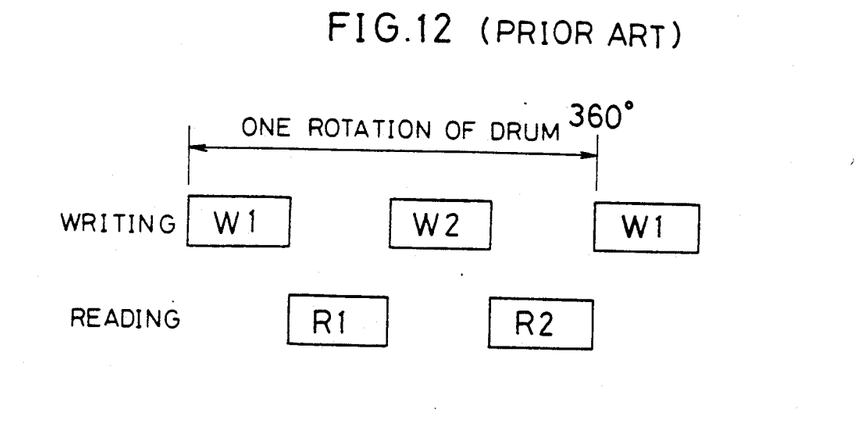
FIG. 12 is a chart showing timing of writing and reading by conventional magnetic heads.

In the rotating drum 9 in the conventional R-DAT provided are the writing heads W1 and W2 and the reading heads R1 and R2 corresponding to the writing heads W1 and W2, respectively. The magnetic tape is wound to the rotating drum 9 for an arc defined by a predetermined angle and then the writing heads W1 and W2 alternatively scan the magnetic tape so that a signal is written on the magnetic tape. In turn, the reading heads R1 and R2 scan each track so that a written signal is read by every writing operation (referring to FIG. 12). Each magnetic head is arranged so that the following conditions may be satisfied, that is, $$\alpha \leq \theta 1, \alpha \leq \theta 2, \alpha \leq \theta 3$$

$$\theta 1 + \theta 2 + \theta 3 \leq 360° \times n - \alpha$$

$$\theta 1 = \theta 3 = 180°$$

where $\alpha$ is an angle to subtend to a length of a magnetic tape contacting the rotating drum 9, n is an integer of 2 or more, $\theta 1$ is a horizontal angle to subtend to a length between the writing head W1 and the writing head W2 about the central axis of the rotating drum 9, $\theta 2$ is a horizontal angle to subtend to a length between the writing head W2 and the reading head R1 about the central axis of the rotating drum 9, $\theta 3$ is a horizontal angle for the reading heads R1 and R2.

Meanwhile, a tendency to decrease a diameter of the rotating drum 9 is seen lately, so that the contact angle $\alpha$ to the rotating drum 9 is naturally increased. For example, when the contact angle $\alpha$ of the magnetic tape to the rotating drum 9 having a diameter of 30 mm is 90°, the contact angle $\alpha$ of the magnetic tape to the rotating drum 9 having a diameter of $\phi$mm is obtained by the following equation, that is, $$\alpha = 90° \times (30/\phi)$$

For example, when $\chi$ is 20 mm, the angle $\alpha$ is equal to 135°.

Figure 13:
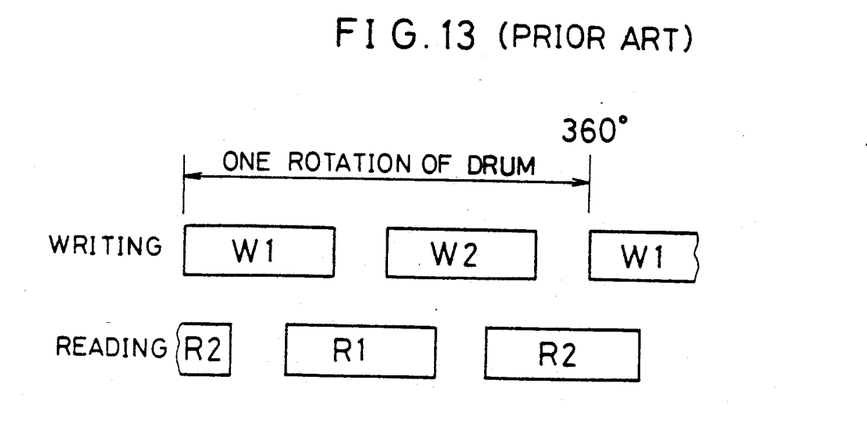
FIG. 13 is a chart showing timing of writing and reading by magnetic heads using a small sized rotating drum.

As described above, when the rotating drum 9 is made to have a small diameter, the contact angle of the magnetic tape to the rotating rum 9 becomes 90° or more. Therefore, in a case where writing and reading operations are performed using four heads during one rotation of the rotating drum using four heads, a writing time is partially overlapped with a reading time, causing crosstalk to be generated as shown in FIG. 13. Then, in order to solve the above problem, writing operation by the writing heads W1 and W2 and reading operation by the reading heads R1 and R2 are each performed once while the rotating drum 9 is rotated twice. Thus, each head is arranged for that purpose. More specifically, as shown in FIG. 11, each magnetic head is arranged so that the following conditions are satisfied, that is, $$\alpha \leq \theta 1, \alpha \leq \theta 2, \alpha \leq \theta 3$$

$$\theta 1 + \theta 2 + \theta 3 \leq 720° - \alpha$$

$$\theta 1 = \theta 3 = 180°$$

where $\alpha$ is an angle to subtend to a length of a magnetic tape contacting the rotating drum 9, n is an integer of 2 or more, $\theta 1$ is a horizontal angle to subtend to a length between the writing head W1 and the writing head W2 about a central axis of the rotating drum 9, $\theta 2$ is a horizontal angle to subtend to a length between the writing head W2 and the reading head R1 about the central axis of the rotating drum 9, $\theta 3$ is a horizontal angle for the reading heads R1 and R2. The other structure is the same as that of the conventional R-DAT shown in FIG. 6.

Figure 14:
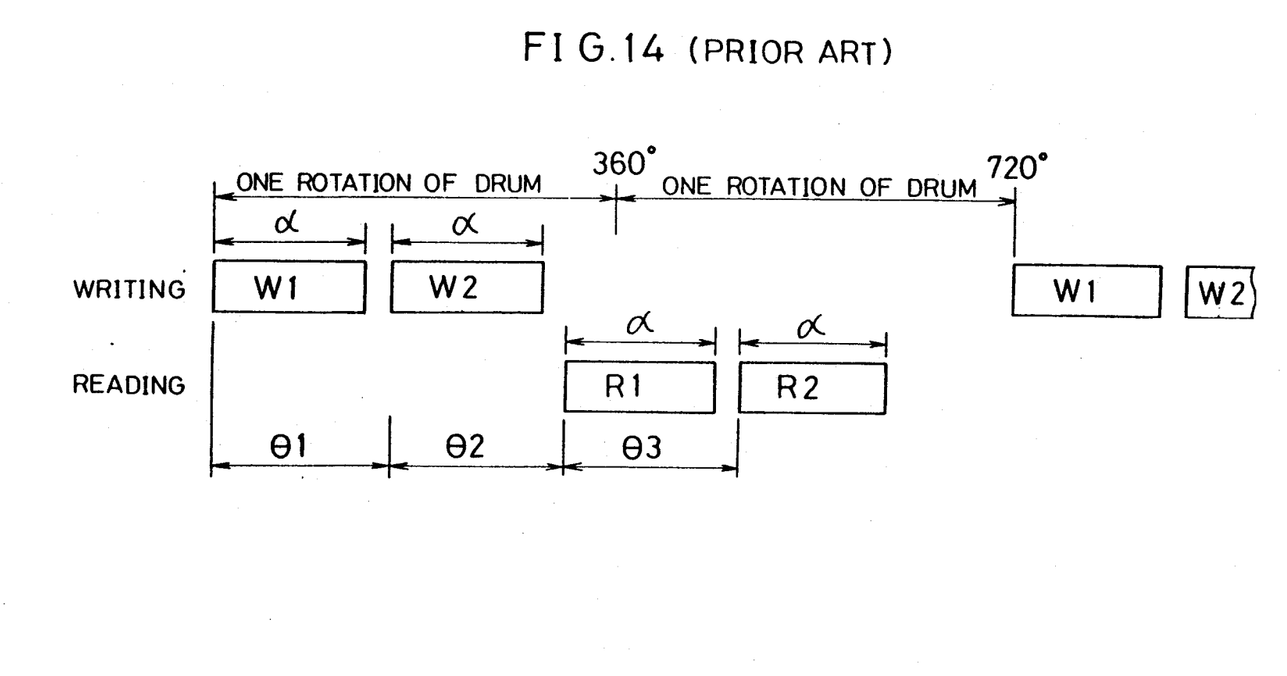
FIG. 14 is a chart showing timing of writing and reading by a magnetic head of a crosstalk prevention type.

When writing and reading operations to the magnetic tape are performed using the writing heads W1 and W2 and the reading heads R1 and R2 which are arranged as described above, timing of writing and reading by each magnetic head is as shown in FIG. 14. As can be seen from FIG. 14, the writing time by the writing heads W1 and W2 is not overlapped with the reading time by the reading heads R1 and R2 at all. Therefore, the crosstalk which is generated in the R-DAT is prevented.

Figure 15:
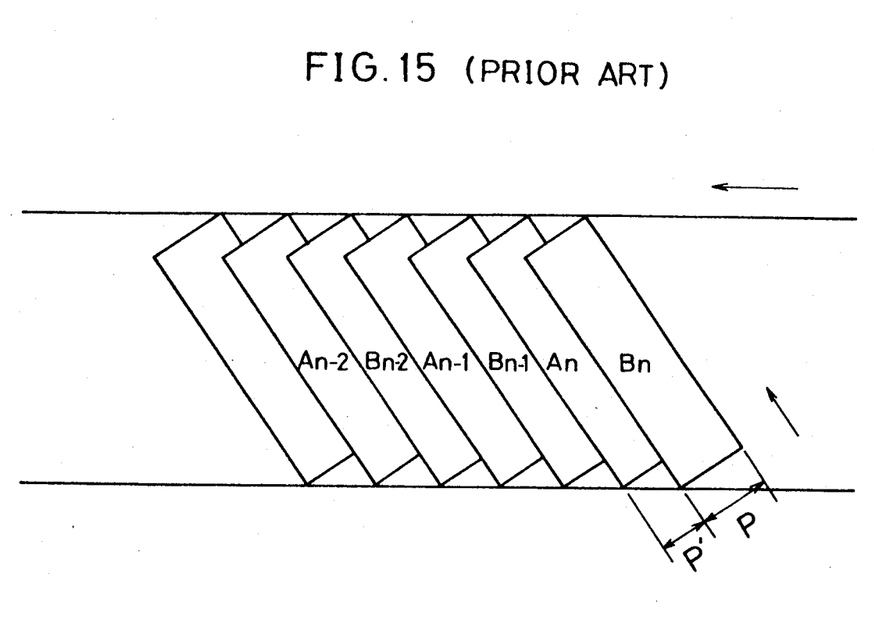
FIG. 15 is a schematic view showing an azimuth format of magnetic tracks formed on a magnetic tape.

In the conventional R-DAT, the recording track on the actual tape is overwritten as shown in FIG. 15 and an overwritten track width P' is, at the time of reading, 13.591 $\mu$m. But a width P of the recording track which is not overwritten is 20.4 $\mu$m. Further, the recording track ... $An_{-1}$, $Bn_{-1}$, $An$ and $Bn$ is used for recording in this sequence.

Figure 5A:
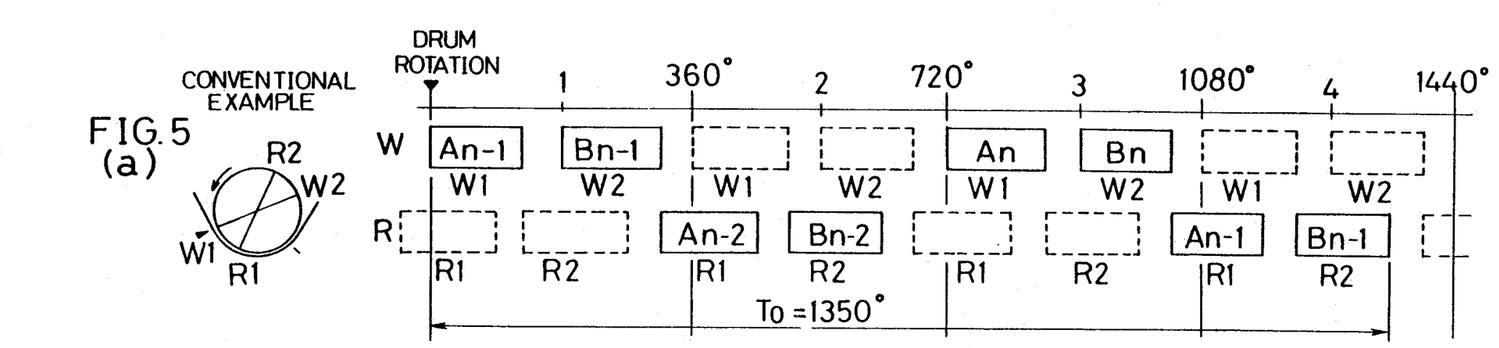
FIGS. 5(a)-(c) constitute a chart showing timing of writing and reading by the magnetic heads of the present invention and that by conventional magnetic heads for comparison.

In the rotating drum 9 shown in FIG. 11, although the tracks An and Bn are recorded by the writing heads W1 and W2, respectively and then should be read by the reading heads R1 and R2, respectively. Then, when the tracks An and Bn are each read by the reading heads R1 and R2, respectively, since the track Bn is not yet overwritten, a track width is large and a track pattern is different from that to be read actually. More specifically, an output is increased. Therefore, in this case, the tracks $An_{-1}$ and $Bn_{-1}$ are read by the reading heads R1 and R2, respectively (referring to FIG. 5(a)).

However, in this magnetic recording apparatus, it is necessary to read the recorded data and examine the error rate as soon as possible and when the error rate is bad, a corrective measure for that should be taken.

In addition, as a related art, there has been known a magnetic write/read device disclosed in Japanese Patent Laid Open No. 203416/1990 in which writing and reading operation which was performed by one rotation of a rotating drum is performed by two or more rotations of the rotating drum, whereby crosstalk is not generated even if the rotating drum having a small diameter is used, or a rotating head type magnetic tape disclosed in Japanese Patent Laid Open No. 68708/1990 in which a track recorded by first and second writing heads is not immediately read but the track after overwritten is read, whereby recording data can be checked on the same condition as that at the time of reproduction mode.

SUMMARY OF THE INVENTION

It is an object of the present invention to provide a magnetic write/read device in which data is recorded by a writing head and the recorded data is read as soon as possible by change into a new arrangement of magnetic heads.

The present invention provides a magnetic write/read device in which first and second writing heads are arranged around a rotating drum, the first and second writing heads being adapted to form first and second tracks respectively in interlacing and azimuth scan style, with partial overwriting on preceding tracks such that one frame is formed by a pair of adjacent first and second tracks, said magnetic write/read device comprising first and second reading heads arranged around the rotating drum in correspondence to the first and second writing heads, respectively and controlling means for controlling each head in sequence such that the first track of the present frame is recorded by the first writing head and then the first and second tracks of the penultimate frame are reproduced by the first and second reading heads, and in turn the second track of the present frame is recorded by the second writing head.

According to the present invention, unitary operation proceeds: the first track of the present frame is recorded by the first writing head and then the first and second tracks of the penultimate frame are reproduced by the first and second reading heads and in turn the second track of the present frame is recorded by the second writing head.

Therefore, data can be read faster than in the conventional art because the second track is recorded later, so that a countermeasure to aggravation of an error rate can be promptly implemented.

DETAILED DESCRIPTION OF THE PREFERRED EMBODIMENTS

Embodiments of the present invention will be described in reference to the drawings hereinafter. However, the present invention is not limited to the above embodiments.

EMBODIMENT 1

Figure 1:
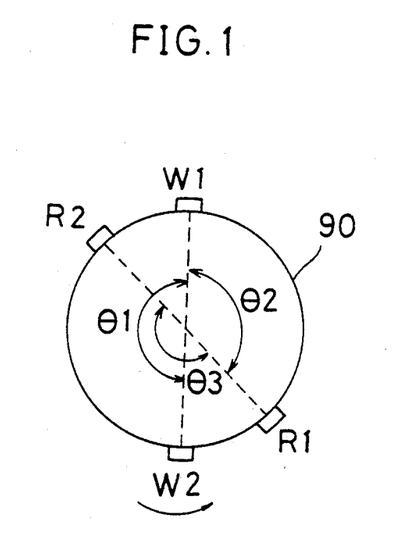
FIG. 1 is a schematic view showing an arrangement of magnetic heads on a rotating drum in accordance with a first embodiment of the present invention.

FIG. 1 is a schematic view showing an arrangement of writing and reading heads on a rotating drum in a R-DAT in accordance with a first embodiment of the present invention.

Figure 2:
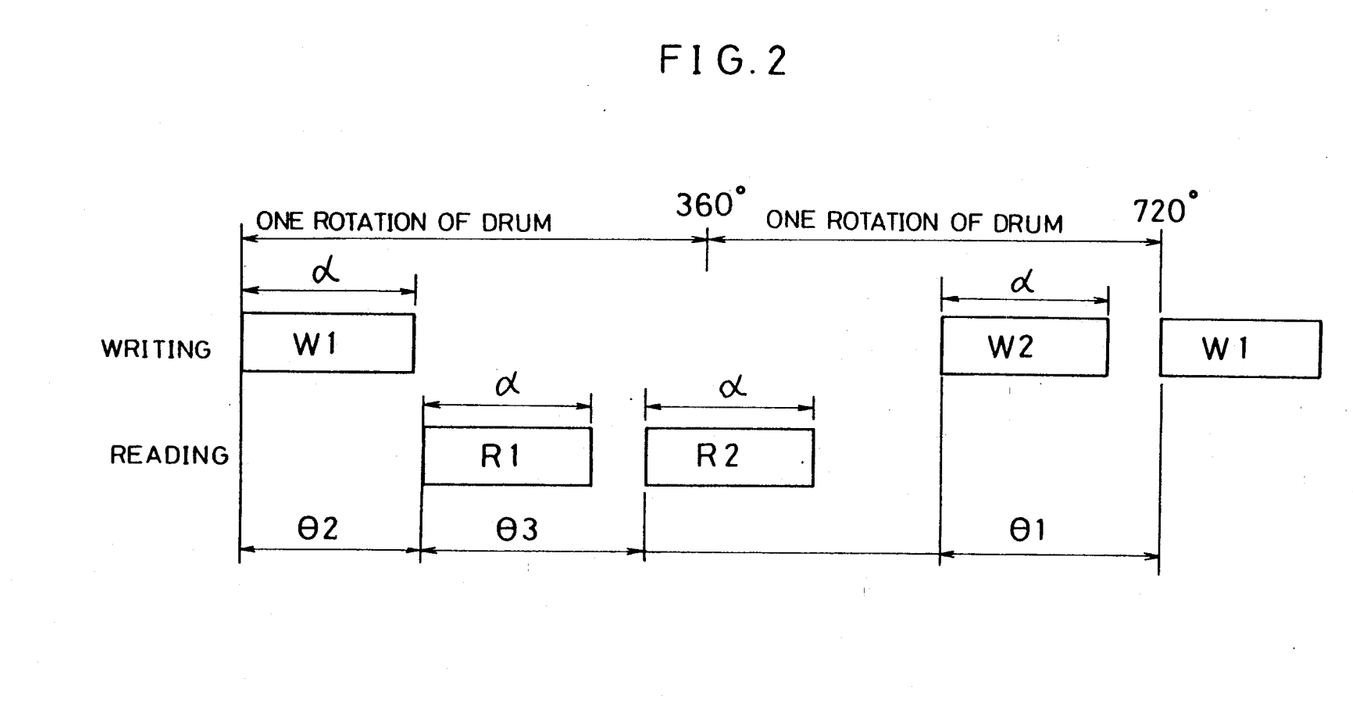
FIG. 2 is a schematic chart showing timing of writing and reading by the magnetic heads in the first embodiment of the present invention.
Figure 5B:
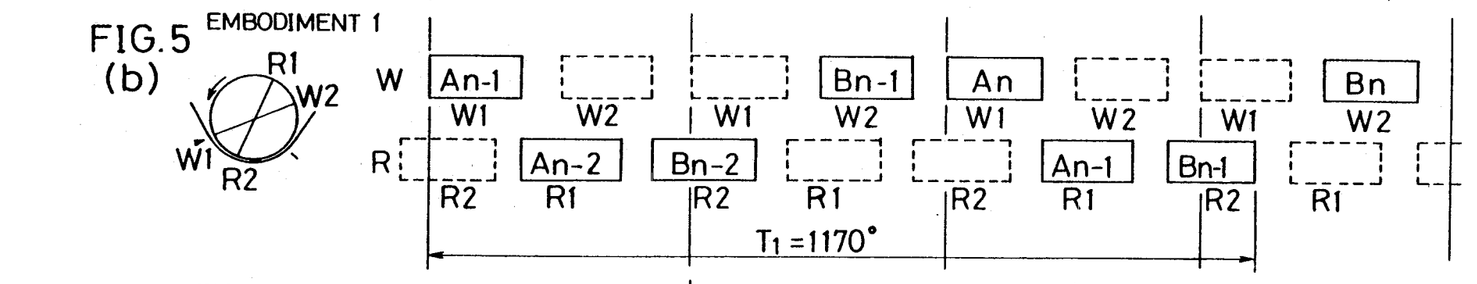

As shown in FIG. 1, according to this embodiment of the present invention, each magnetic head is arranged so the following condition may be satisfied, that is, $$\alpha \leq \theta 1, \alpha \leq \theta 2, \alpha \leq \theta 3$$

$$\theta 1 + \theta 2 + \theta 3 < 360° \times n\text{-}\alpha$$

$$\theta 1 = \theta 3 = 180°$$

where $\alpha$ is an angle to subtend to a length formed on a rotating drum 90 in contact with a magnetic tape, n is an integer of 2 or more, $\theta 1$ is a horizontal angle subtended to an arc between a first writing heat W1 and a second writing head W2 based on a central shaft of the rotating drum 90, $\theta 2$ is a horizontal angle subtended to an arc between the second writing head W2 and a first reading head R1 based on the central shaft of the rotating drum 90, $\theta 3$ is a horizontal angle subtended to an arc between the first reading head R1 and a second reading head R2. In addition, the writing heads W1 and W2 or the reading heads R1 and R2 are reversely arranged as compared with the conventional example. When writing or reading is performed on the magnetic tape using the writing heads W1 and W2 and the reading heads R1 and R2 arranged as described above, timing of the writing and reading by each magnetic head is as shown in FIG. 2 (referring to FIG. 5(b)).

More specifically, as shown in FIG. 5(b), a recording track An shown in FIG. 15 is recorded on a tape by the writing head W1 and then a recording track $An_{-1}$ and a recording track $Bn_{-1}$ are read by the reading head R1 and the reading head R2, respectively which is different from the conventional art. Then, a recording track Bn is recorded by the writing head W2.

EMBODIMENT 2

Figure 3:
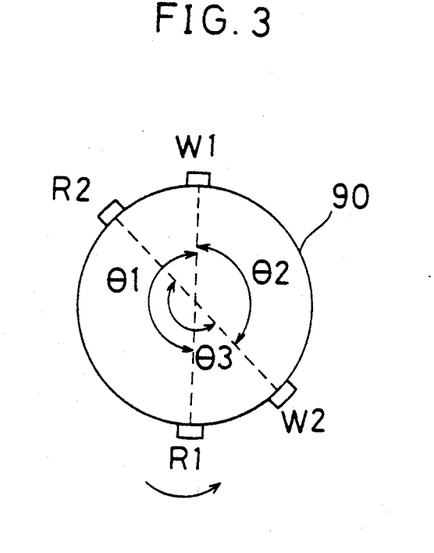
FIG. 3 is a schematic view showing an arrangement of magnetic heads on a rotating drum in accordance with a second embodiment of the present invention.

FIG. 3 is a schematic view showing an arrangement of writing and reading heads on a rotating drum of a R-DAT in accordance with a second embodiment of the present invention.

As shown in FIG. 3, this embodiment of the present invention is different from the first embodiment shown in FIG. 1 in that the arrangement of the second writing head W2 and the first reading head R1 is reversed or exchanged.

Figure 4:
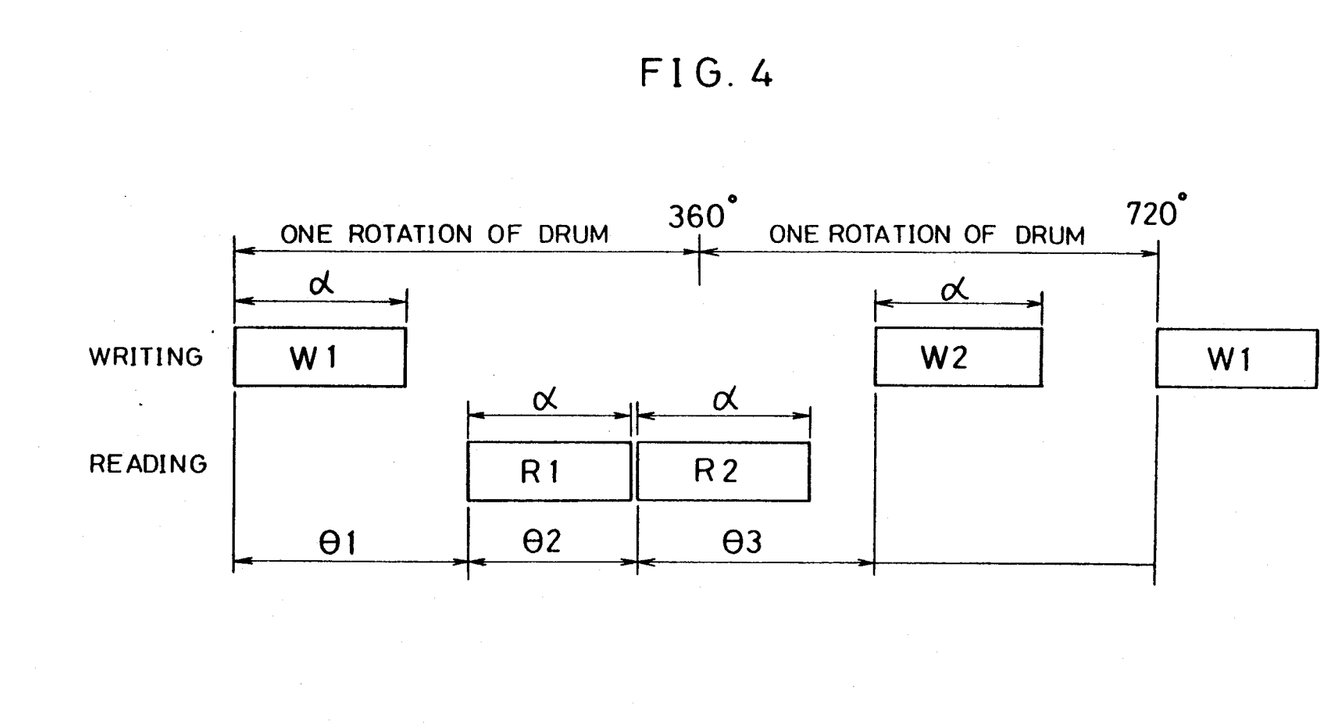
FIG. 4 is a schematic chart showing timing of writing and reading by the magnetic heads in the second embodiment of the present invention.
Figure 5C:
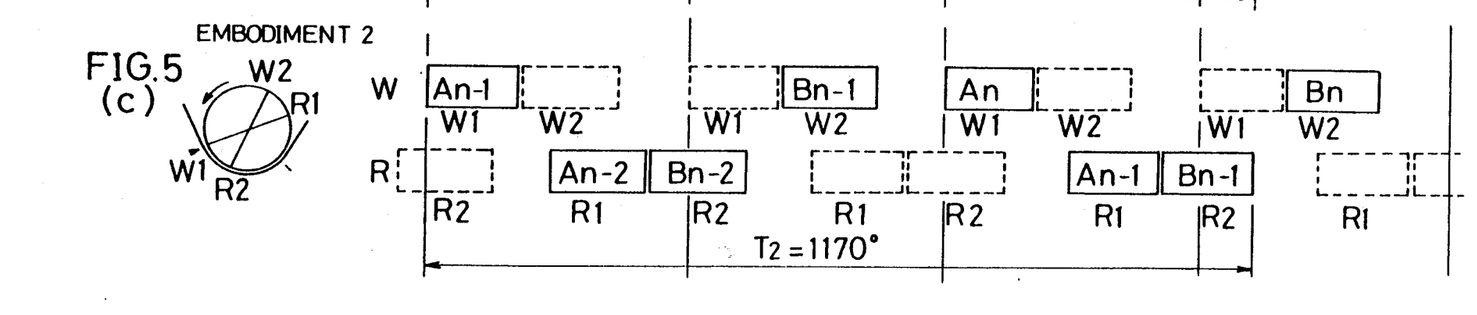

When writing and reading are performed on the magnetic tape using the writing heads W1 and W2 and the reading heads R1 and R2 arranged as described above, timing of the writing and reading by each magnetic head is as shown in FIG. 4 (referring to FIG. 5(c)).

More specifically, similar to the first embodiment of the present invention, the recording track An is recorded on a tape by the writing head W1 and then the recording track $An_{-1}$ and the recording track $Bn_{-1}$ are read by the reading head R1 and the reading head R2 in this second embodiment of the present invention. Then, the recording track Bn is recorded by the writing head W2.

As described above, although the recording tracks An and Bn are recorded and then the recording tracks $An_{-1}$ and $Bn_{-1}$ are read in the conventional art, the recording track An is recorded and then the recording tracks $An_{-1}$ and $Bn_{-1}$ are read in this embodiment of the present invention. As a result, reading is performed faster than the conventional art because the recording track Bn is recorded later.

Therefore, it is allowable to take an earlier countermeasures for the aggravation of error rate.

As describe above, according to the present invention, even if a small sized rotating drum is used, it is allowable to quicken the timing of reading as compared with the conventional art. As a result, an earlier step can be taken for the aggravation of error rate.

While only certain presently preferred embodiments have been described in detail, as will be apparent with those skilled in the art, certain changes and modifications can be made without departing from the scope of the invention as defined by the following claims.

What is claimed is:

1. A magnetic write/read device in which first and second writing heads are arranged around a rotating drum, the first and second writing heads being adapted to form first and second tracks respectively in interlacing azimuth scan style, with partial overwriting on preceding tracks such that one frame is formed by a pair of adjacent first and second tracks, said magnetic write/read device comprising:

first and second reading heads arranged around the rotating drum in correspondence to the first and second writing heads, respectively; and controlling means for controlling each head in sequence such that the first track of the present frame is recorded by the first writing head and then the first and second tracks of the penultimate frame are reproduced by the first and second reading heads, and in turn the second track of the present frame is recorded by the second writing head.

2. A magnetic write/read device as set forth in claim 1, wherein the first and second writing heads are provided on a peripheral surface of the rotating drum and arranged such that a subtending angle based on the central axis of the rotating drum forms 180 degrees, the first and second reading heads are provided on a peripheral surface of the rotating drum and arranged such that a subtending angle based on the central axis of the rotating drum forms 180 degrees, and the first writing head and the first reading head are arranged such that a subtending angle based on the central axis of the rotating drum ranges from $\alpha$ degree to $(360-\alpha)$ degree when a magnetic tape is set to contact the rotating drum with $\alpha$ degree subtending angle based on the central axis of the rotating drum.

3. A magnetic write/read device as set forth in claim 1, wherein the first writing head and the first reading head are provided on a peripheral surface of the rotating drum and arranged such that a subtending angle based on the central axis of the rotating drum forms 180 degrees, the second writing head and the second reading head are provided on a peripheral surface of the rotating drum and arranged such that a subtending angle based on the central axis of the rotating drum forms 180 degrees, and the first writing head and the second writing head are arranged such that a subtending angle based on the central axis of the rotating drum ranges from $\alpha$ degree to $(360-\alpha)$ degree when a magnetic tape is set to contact the rotating drum with $\alpha$ degree subtending angle based on the central axis of the rotating drum.

* * * * *